United States Patent
Azimova et al.

(10) Patent No.: US 12,122,727 B2
(45) Date of Patent: Oct. 22, 2024

(54) AMMONIUM SULFATE FERTILIZER WITH WATER-SOLUBLE MICRONUTRIENTS

(71) Applicant: AdvanSix Resins & Chemicals LLC, Parsippany, NJ (US)

(72) Inventors: Maria A. Azimova, Richmond, VA (US); Huajun Yuan, Parsippany, NJ (US); Stephanie Williams, Parsippany, NJ (US); Julianne Fredericks, Parsippany, NJ (US)

(73) Assignee: AdvanSix Resins & Chemicals LLC., Parsippany, NJ (US)

( * ) Notice: Subject to any disclaimer, the term of this patent is extended or adjusted under 35 U.S.C. 154(b) by 874 days.

(21) Appl. No.: 17/279,472

(22) PCT Filed: Sep. 18, 2019

(86) PCT No.: PCT/US2019/051744
§ 371 (c)(1),
(2) Date: Mar. 24, 2021

(87) PCT Pub. No.: WO2020/068515
PCT Pub. Date: Apr. 20, 2020

(65) Prior Publication Data
US 2022/0002211 A1 Jan. 6, 2022

Related U.S. Application Data
(60) Provisional application No. 62/737,147, filed on Sep. 27, 2018.

(51) Int. Cl.
*C05C 3/00* (2006.01)
*C05D 9/02* (2006.01)
*C05G 5/12* (2020.01)

(52) U.S. Cl.
CPC ........... *C05C 3/005* (2013.01); *C05D 9/02* (2013.01); *C05G 5/12* (2020.02)

(58) Field of Classification Search
None
See application file for complete search history.

(56) References Cited

U.S. PATENT DOCUMENTS

| 3,620,708 A | 11/1971 | Ott et al. |
| 3,951,639 A | 4/1976 | Windgassen |

(Continued)

FOREIGN PATENT DOCUMENTS

| AU | 704560 B2 | 4/1999 |
| AU | 2006200467 A1 | 8/2006 |

(Continued)

OTHER PUBLICATIONS

International Search Report and Written Opinion received for PCT Patent Application No. PCT/US2019/051744, mailed on Dec. 4, 2019, 11 pages.

(Continued)

*Primary Examiner* — Wayne A Langel
(74) *Attorney, Agent, or Firm* — Faegre Drinker Biddle & Reath LLP

(57) ABSTRACT

A fertilizer composition, comprising solid granules each including a homogeneous blend of ammonium sulfate, a water insoluble oxide of a micronutrient metal, and a water-soluble sulfate of the micronutrient metal. A method of forming a fertilizer composition, comprising the steps of: combining ammonium sulfate and a water insoluble oxide of a micronutrient metal; granulating the ammonium sulfate and water insoluble oxide of the micronutrient metal in the presence of a liquid to initiate reaction of a portion of the ammonium sulfate with a portion of the water insoluble oxide of the micronutrient metal to form ammonia and a (Continued)

water-soluble sulfate of the micronutrient metal; and producing a fertilizer composition in the form of solid fertilizer granules each comprising a homogeneous blend of ammonium sulfate, the water insoluble oxide of the micronutrient metal, and the water-soluble sulfate of the micronutrient metal.

18 Claims, 2 Drawing Sheets

(56) References Cited

U.S. PATENT DOCUMENTS

| | | | |
|---|---|---|---|
| 3,981,713 | A | 9/1976 | Tucker et al. |
| 4,210,437 | A | 7/1980 | Windgassen et al. |
| 4,334,906 | A | 6/1982 | Young |
| 4,356,021 | A | 10/1982 | Kenton |
| 4,576,626 | A | 3/1986 | Bauer et al. |
| 4,936,897 | A | 6/1990 | Pipko et al. |
| 5,152,821 | A | 10/1992 | Walter |
| 5,383,951 | A * | 1/1995 | Cross ............... C05C 3/005 71/64.11 |
| 5,997,600 | A | 12/1999 | Dean |
| 6,210,459 | B1 | 4/2001 | Sanders |
| 6,709,685 | B1 | 3/2004 | Van et al. |
| 6,749,659 | B1 | 6/2004 | Yu et al. |
| 7,410,522 | B2 | 8/2008 | Green |
| 2002/0178772 | A1 | 12/2002 | Hince |
| 2011/0152083 | A1 | 6/2011 | Lu et al. |
| 2012/0160001 | A1 | 6/2012 | Ponder et al. |
| 2015/0166418 | A1 * | 6/2015 | Jain ............... C05C 3/005 71/61 |
| 2016/0075607 | A1 | 3/2016 | Aqel et al. |
| 2017/0101351 | A1 | 4/2017 | Ponder et al. |
| 2018/0044078 | A1 | 2/2018 | Valentine |

FOREIGN PATENT DOCUMENTS

| | | |
|---|---|---|
| CN | 103396188 A | 11/2013 |
| CN | 103804097 A | 5/2014 |
| CN | 105152774 A | 12/2015 |
| CN | 105367235 A | 3/2016 |
| CN | 107141087 A | 9/2017 |
| CN | 107162724 A | 9/2017 |
| CN | 107686399 A | 2/2018 |
| CN | 108456089 A | 8/2018 |
| EP | 1170272 B1 | 4/2003 |
| GB | 1340884 A | 12/1973 |
| JP | 58-204891 A | 11/1983 |
| KR | 10-1999-0013987 A | 2/1999 |
| KR | 10-2001-0053190 A | 6/2001 |
| RU | 2104943 C1 | 2/1998 |
| RU | 2113421 C1 | 6/1998 |
| RU | 2655336 C1 | 5/2018 |
| WO | 91/09818 A1 | 7/1991 |
| WO | 2008/013510 A2 | 1/2008 |
| WO | 2014/181149 A2 | 11/2014 |
| WO | 2018/073085 A1 | 4/2018 |
| WO | 2018/107212 A1 | 6/2018 |

OTHER PUBLICATIONS

Second Written Opinion received for PCT Patent Application No. PCT/US2019/051744, mailed on Jun. 16, 2020, 4 pages.

Lanier et al., "Granulation of Complex Fertilizers Containing Ammonium Sulfate by Melt Technology," Environmental Protection Technology Series, Dec. 1976, pp. 106.

Soils—Part 8: Characteristics of Fertilizer Materials: Micronutrient Fertilizers, URL: https://passel2.unl.edu/view/lesson/d01bf6ce5f62/7.

* cited by examiner

AMMONIUM SULFATE FERTILIZER WITH WATER-SOLUBLE MICRONUTRIENTS

CROSS-REFERENCE TO RELATED APPLICATION

This application is a U.S. 371 national stage application of International Application No. PCT/US2019/051744, filed 18 Sep. 2019, which claims the benefit of U.S. Provisional Application Ser. No. 62/737,147, filed Sep. 27, 2018, both of which are herein incorporated by reference in their entireties.

FIELD

The present disclosure provides fertilizer compositions and, in particular, provides ammonium sulfate fertilizer compositions including micronutrients, such as zinc, which are present in a water-soluble form.

BACKGROUND

Primary fertilizers include one or more primary plant nutrients including nitrogen, potassium and/or phosphorus, and are applied to soil to provide nutrients during crop growth. Micronutrients are also important to plant growth and are frequently applied to soil in an additional or supplemental application step during a crop fertilization process in addition to the application of a primary fertilizer such as ammonium sulfate.

Zinc is an important micronutrient for plant growth and may be added to a crop field via a variety of chemical forms or sources, including zinc oxide, zinc sulfate, and zinc-ethylenediaminetetraacetic acid (EDTA). Zinc oxide is a relatively inexpensive compound and therefore provides a significant cost advantage over other zinc sources. However, zinc oxide is water insoluble, does not readily distribute into soil upon exposure to moisture, and therefore is not a particularly effective source of elemental zinc.

What is needed is a fertilizer composition which includes readily available sources of micronutrients such as zinc.

SUMMARY

The present disclosure provides a primary fertilizer composition including at least one macronutrient, such as an ammonium sulfate fertilizer, and which also includes at least one micronutrient metal in a water-soluble form such that the micronutrient metal is readily available for dissolution and distribution into soil upon exposure to moisture for promoting crop growth. The micronutrient metal may be in the form a water-soluble salt such as zinc sulfate, for example. The micronutrient metal is chemically converted from an initial, water insoluble form into a water-soluble form in-situ during granulation of the fertilizer composition to form solid granules of a homogenous blend of ammonium sulfate, a water insoluble oxide of the micronutrient metal oxide, and the water-soluble sulfate of the micronutrient metal.

Incorporating readily available micronutrient metals into a primary fertilizer composition which provides primary nutrients such as nitrogen, phosphorus, and/or potassium, such as an ammonium sulfate fertilizer composition, advantageously reduces the number of fertilizer application steps, eliminating the need for providing an application of micronutrients in addition to the application of the primary fertilizer composition.

In one form thereof, the present disclosure provides a fertilizer composition, including solid granules each including a homogeneous blend of ammonium sulfate, a water insoluble oxide of a micronutrient metal, and a water-soluble sulfate of the micronutrient metal.

The solid granules may each include at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition.

The solid granules may each include ammonium sulfate in an amount of 80 wt. % to 98 wt. %, based on a total weight of the fertilizer composition, and the water insoluble oxide of the micronutrient metal in an amount of 0.1 wt. % to 3 wt. %, based on a total weight of the fertilizer composition or the water-soluble sulfate of the micronutrient metal in an amount of 0.1 wt. % to 5 wt. %, based on a total weight of the fertilizer composition.

The micronutrient metal may include at least one metal selected from the group consisting of zinc, copper, iron, magnesium, manganese, molybdenum, and cobalt. The micronutrient metal may be zinc, the water insoluble oxide of the micronutrient metal may be zinc oxide, and the water-soluble sulfate of the micronutrient metal may be zinc sulfate.

The solid granules of the fertilizer composition may further include at least one binder present in an amount of 1.0 wt. % to 10.0 wt. %, based on a total weight of the fertilizer composition.

All chemical components in the fertilizer composition other than ammonium sulfate, the water insoluble oxide of the micronutrient metal, the water-soluble sulfate of the micronutrient metal, and the binder may be present in a total amount of less than 1.0 wt. %.

In another form thereof, the present disclosure provides a method of forming a fertilizer composition, including the steps of: combining ammonium sulfate and a water insoluble oxide of a micronutrient metal; granulating the ammonium sulfate and water insoluble oxide of the micronutrient metal in the presence of a liquid to initiate reaction of a portion of the ammonium sulfate with a portion of the water insoluble oxide of the micronutrient metal to form ammonia and a water-soluble sulfate of the micronutrient metal; and producing a fertilizer composition in the form of solid fertilizer granules each comprising a homogeneous blend of ammonium sulfate, the water insoluble oxide of the micronutrient metal, and the water-soluble sulfate of the micronutrient metal.

The liquid may be an aqueous solution of a binder. The method may further include the additional steps of: adding an ammonia conversion agent to the mixture; and reacting the ammonia conversion agent with the ammonia to form ammonium sulfate.

The solid fertilizer granules may each include at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition.

The solid fertilizer granules may each include ammonium sulfate in an amount of 80 wt. % to 98 wt. %, based on a total weight of the fertilizer composition, and may additionally include the water insoluble oxide of the micronutrient metal in an amount of 0.1 wt. % to 3 wt. %, based on a total weight of the fertilizer composition or the water-soluble sulfate of the micronutrient metal in an amount of 0.1 wt. % to 5 wt. %, based on a total weight of the fertilizer composition.

The micronutrient metal may include at least one metal selected from the group consisting of zinc, copper, iron, magnesium, manganese, molybdenum, and cobalt. The micronutrient metal may be zinc, the water insoluble oxide of the micronutrient metal may be zinc oxide, and the water-soluble sulfate of the micronutrient metal may be zinc sulfate.

The solid fertilizer granules may further include at least one binder present in an amount of 1.0 wt. % to 10.0 wt. %, based on a total weight of the fertilizer composition.

All chemical components in the solid fertilizer granules other than ammonium sulfate, the water insoluble oxide of the micronutrient metal, the water-soluble sulfate of the micronutrient metal, and the binder may be present in a total amount less of than 1.0 wt. %.

BRIEF DESCRIPTION OF THE DRAWINGS

The above mentioned and other features of the disclosure, and the manner of attaining them, will become more apparent and the disclosure itself will be better understood by reference to the following description of embodiments of the disclosure taken in conjunction with the accompanying drawings.

Figure 1:
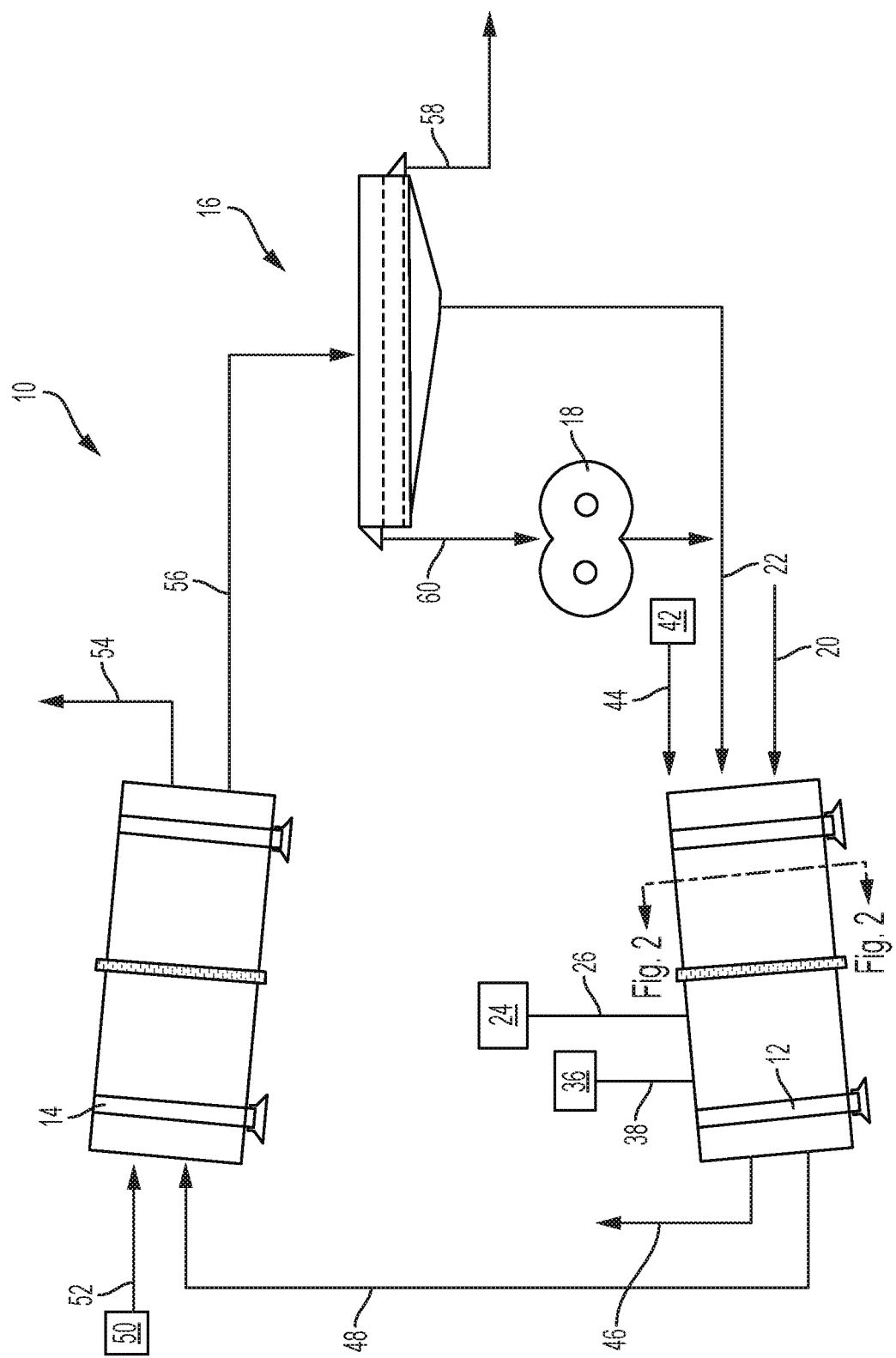
FIG. 1 is a schematic illustration of a granulation process according to the present disclosure.

Although the drawings represent embodiments of various features and components according to the present disclosure, the drawings are not necessarily to scale and certain features may be exaggerated in order to better illustrate and explain the present disclosure. The exemplification set out herein illustrates an embodiment of the disclosure, and such exemplification is not to be construed as limiting the scope of the disclosure in any manner.

DETAILED DESCRIPTION

The present fertilizer composition provides at least one of the three primary macronutrients of nitrogen, phosphorous, and potassium, and therefore may be referred to herein as a primary fertilizer. The fertilizer composition may also include a least one secondary nutrient, or micronutrient, such as zinc, calcium, magnesium, and/or sulfur, for example.

In one embodiment, the fertilizer composition includes a primary, or majority amount, based on wt. %, of ammonium sulfate, and may be referred to herein as an ammonium sulfate-based fertilizer. The ammonium sulfate may be initially present in the overall fertilizer composition, prior to granulation as discussed below, in an amount as little as 80 wt. %, 85 wt. % or 90 wt. %, or as great as 93 wt. %, 95 wt. % or 98 wt. %, or within any range defined between and including any two of the foregoing values, such as 80 wt. % to 98 wt. %, 85 wt. % to 95 wt. %, or 90 wt. % to 93 wt. %, for example, based on the combined weight of the ammonium sulfate and a water insoluble salt of the micronutrient metal.

Suitable micronutrients that may be incorporated into the fertilizer composition in accordance with the method disclosed herein include micronutrient metals such as copper (Cu), iron (Fe), manganese (Mn), molybdenum (Mo), zinc (Zn), cobalt (Co), and magnesium (Mg). One or more of such micronutrient metals may be incorporated into the present fertilizer composition and, in the present disclosure, zinc is exemplified.

The micronutrient metals may initially be in the form of a metal oxide which is water insoluble. For example, zinc may initially be provided in the form of zinc oxide (ZnO), which has a minimal solubility in water of only 0.016 g/L at 25° C. Other water insoluble micronutrients in the form of metal salts include copper (II) oxide (CuO), iron (II) oxide (FeO), iron (III) oxide ($Fe_2O_3$), magnesium oxide (MgO), molybdenum (VI) oxide ($MoO_3$), cobalt (II) oxide (CoO) and manganese oxide (MnO).

As used herein, the term "water-soluble" refers to a chemical compound having a water solubility of at least 0.05 g/L at 25° C., and the term "water insoluble" refers to a chemical compound having a water solubility less than 0.05 g/L at 25° C.

The water insoluble salt of the micronutrient metal may be initially present in the fertilizer composition, prior to granulation as discussed below, in an amount as little as 0.1 wt. %, 0.5 wt. % or 1 wt. %, or as great as 1.5 wt. %, 3 wt. % or 5 wt. %, or within any range defined between and including any two of the foregoing values, such as 0.1 wt. % to 5 wt. %, 0.5 wt. % to 3 wt. %, or 1 wt. % to 1.5 wt. %, for example, based on the combined weight of the ammonium sulfate and the water insoluble micronutrient metal salt.

According to the present disclosure, the present fertilizer compositions are formed by a granulation process in which granules are formed by the addition of a binder, typically in the form of a liquid, onto a powder bed including ammonium sulfate and the water insoluble oxide of the micronutrient metal, which bed may be under the influence of an impeller (in a high-shear granulator), screws (in a twin-screw granulator) or air (in a fluidized bed granulator). The wetting of the powder bed under agitation results in the formation of granules from the aggregation of the primary powder particles of the foregoing components to produce granules by the mixing of water into the powders with the binder enhancing the bonds between the particles when the water is evaporated during drying of the granules. During granulation, a water-soluble sulfate of the micronutrient metal is formed in situ as described below.

The binder liquid added to the granulator during the granulation process may be water only or may be an aqueous solution of water and a binder such as a sugar (saccharide) or carbohydrate-based binder, gypsum powder, a starch, a citrus, or a ligand-type compound. In one embodiment, the binder liquid may be sprayed directly onto the particles during the granulation process.

The water in the binder liquid acidifies the water insoluble oxide of the micronutrient metal to at least partially convert same into the water-soluble sulfate of the micronutrient metal as described below.

The binder in the binder liquid provides a binding matrix which creates bonds between particles of ammonium sulfate, the water insoluble oxide of the micronutrient metal, and the water-soluble sulfate of the micronutrient metal. Typically, the binder is added to the fertilizer composition in an amount as little as 1 wt. %, 2 wt. % or 4 wt. %, or as great as 6 wt. %, 8 wt. % or 10 wt. %, or within any range defined between and including any two of the foregoing values, such as 1 wt. % to 10 wt. %, 2 wt. % to 8 wt. %, or 4 wt. % to 6 wt. %, for example, based on the total weight of the fertilizer composition prior to granulation.

According to the present disclosure, it has been found that exposure of the ammonium sulfate and water insoluble oxide of the micronutrient metal to water or moisture during the granulation process converts the water insoluble oxide of the micronutrient metal into a water-soluble sulfate of the micronutrient metal by reaction with ammonium sulfate according to the following general overall reaction (I) below, exemplified for zinc as the micronutrient metal:

$$ZnO + (NH_4)_2SO_4 \rightarrow ZnSO_4 + H_2O + 2NH_3 \quad (I)$$

In the foregoing reaction (I), the water-soluble sulfate of the micronutrient metal is formed as zinc sulfate, together with water and ammonia. The generation of ammonia is detectable by smell, indicating that reaction (I) has taken place. Zinc oxide is an amphoteric oxide and may react with a strong acid or with a base. In this manner, it is thought that reaction (I) proceeds by zinc oxide (ZnO) forming zinc hydroxide ($Zn(OH)_2$) as weak base in solution, with the zinc hydroxide then reacting with ammonium sulfate (($NH_4)_2SO_4$) to form zinc sulfate ($ZnSO_4$), water ($H_2O$) and ammonia ($NH_3$).

In some embodiments, it may be advantageous to avoid the loss of nitrogen due to the generation of volatile ammonia by the addition, during the granulation process, of a stoichiometric amount of an ammonia conversion agent, which may be in the form of an acid such as sulfuric acid, for example, which reacts with generated ammonia to form, or re-generate, ammonium sulfate according to reaction (II) below:

$$2NH_3 + H_2SO_4 \rightarrow (NH_4)_2SO_4 \quad (II)$$

In one embodiment, the ammonia conversion agent may be sprayed directly onto the particles during the granulation process to minimize the loss of nitrogen due to ammonia evolution.

Advantageously, the water-soluble metal sulfate formed in situ during the granulation process may be very readily soluble or dispersible in water upon exposure to moisture. For example, zinc sulfate has a water solubility significantly higher than 0.05 g/L at 25° C., specifically, about 577 g/L at 25° C., which promotes ready dissolution and distribution of the micronutrient metal into soil once the fertilizer composition is applied to a field and exposed to moisture.

However, it is also possible for an amount of the water-soluble sulfate of the micronutrient metal to be present in the initial composition prior to granulation, such as in an amount as little as 0.1 wt. %, 0.5 wt. % or 1 wt. %, or as great as 1.5 wt. %, 2 wt. % or 3 wt. %, or within any range defined between and including any two of the foregoing values, such as 0.1 wt. % to 3 wt. %, 0.5 wt. % to 2 wt. %, or 1 wt. % to 1.5 wt. %, for example, based on the overall weight of the fertilizer composition. If so, the water-soluble sulfate of the micronutrient that is initially present will remain in such form throughout the granulation process, and the total amount of water-soluble sulfate of the micronutrient metal in the final product will be increased based on an additional amount of the water-soluble sulfate of the micronutrient metal being formed from the water insoluble oxide of the micronutrient metal during the granulation process.

The final fertilizer product is in the form of bulk, dried, solid granules each including a homogeneous blend of ammonium sulfate, a water insoluble oxide of a micronutrient metal, and a water-soluble sulfate of the micronutrient metal, and optionally a binder. Alternatively stated, the ammonium sulfate, water insoluble oxide of the micronutrient metal, water-soluble sulfate of the micronutrient metal, and optional binder are evenly distributed throughout each granule.

In the final fertilizer composition, the ammonium sulfate in each granule may be present in an amount as little as 80 wt. %, 85 wt. % or 90 wt. %, or as great as 93 wt. %, 95 wt. % or 98 wt. %, or within any range defined between and including any two of the foregoing values, such as 80 wt. % to 98 wt. %, 85 wt. % to 95 wt. %, or 90 wt. % to 93 wt. %, for example, based on the overall weight of the fertilizer composition.

In the final fertilizer composition, the water insoluble oxide of the micronutrient metal may be present in an amount as little as 0.1 wt. %, 0.5 wt. % or 1 wt. %, or as great as 1.5 wt. %, 2 wt. % or 3 wt. %, or within any range defined between and including any two of the foregoing values, such as 0.1 wt. % to 3 wt. %, 0.5 wt. % to 2 wt. %, or 1 wt. % to 1.5 wt. %, for example, based on the overall weight of the fertilizer composition.

In the final fertilizer composition, the water-soluble sulfate of the micronutrient metal may be present in an amount as little as 0.1 wt. %, 0.5 wt. % or 1 wt. %, or as great as 1.5 wt. %, 3 wt. % or 5 wt. %, or within any range defined between and including any two of the foregoing values, such as 0.1 wt. % to 3 wt. %, 0.5 wt. % to 2 wt. %, or 1 wt. % to 1.5 wt. %, for example, based on the overall weight of the fertilizer composition.

In the final fertilizer composition, the binder may be present in an amount as little as 1 wt. %, 2 wt. % or 4 wt. %, or as great as 6 wt. %, 8 wt. % or 10 wt. %, or within any range defined between and including any two of the foregoing values, such as 1 wt. % to 10 wt. %, 2 wt. % to 8 wt. %, or 4 wt. % to 6 wt. %, for example.

In the final fertilizer composition, all chemical components other than ammonium sulfate, the water insoluble oxide of the micronutrient metal, the water-soluble sulfate of the micronutrient metal, and the binder may be present in a total amount of less than 5.0 wt. %, 3.0 wt. %, 1.0 wt. %, 0.5 wt. %, or 0.1 wt. %.

The present fertilizer product may be formed via a granulation process, such as by drum granulation or mixer mill granulation. Typically, the ammonium sulfate will be ground prior to granulation to a relatively coarse powder to mostly pass through a Tyler 24 screen (particle size about 0.7 mm or less).

Referring to FIG. 1, an exemplary schematic of a granulation process or configuration according to the present disclosure is shown. Granulation configuration 10 generally includes granulation drum 12, dryer drum 14, screener 16, and crusher 18. The granulation configuration 10 is configured as a loop to recycle off-specification (i.e., oversized and/or undersized) material back to granulation drum 12 until the material is brought into target specifications.

Figure 2:
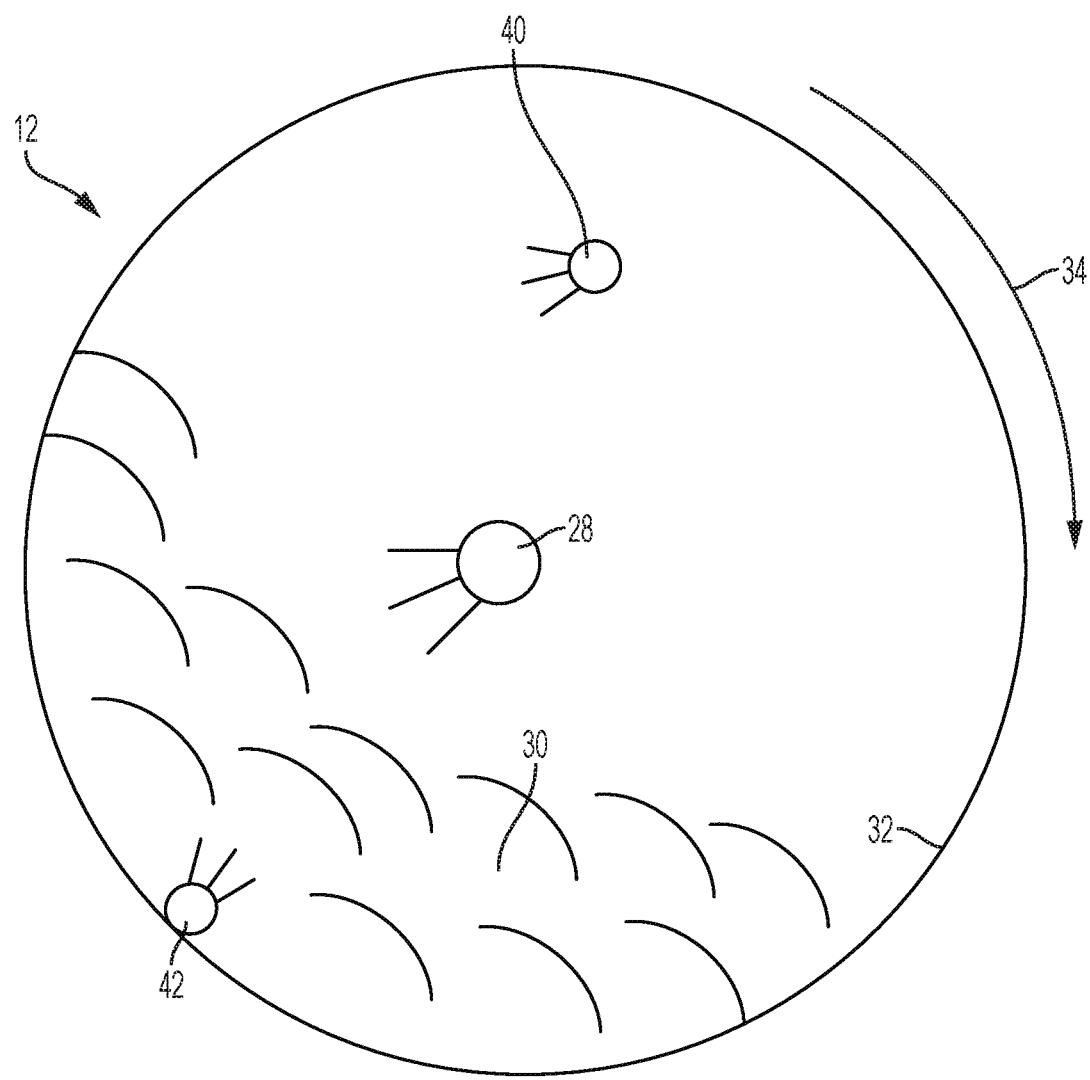
FIG. 2 is a cross-sectional view taken along line 2-2 of FIG. 1.

Granulation drum 12 includes inlet 20 for supply of one or both, or a mixture of, the ammonium sulfate and the water insoluble oxide of the micronutrient metal into the interior of granulation drum 12. Granulation drum 12 also includes an inlet 22 that provides recycled material from crusher 18 and screener 16. A supply 24 of binder liquid supplies the binder liquid to granulation drum 12 via line 26 and, as shown in FIG. 2, one or more nozzles 28 may be present within granulation drum 12 for spraying the binder liquid onto a bed of granules 30 which are spread about the inner surface 32 of granulation drum 12. In operation, the granulation drum 12 rotates along the direction of arrow 34. Similarly, with reference to FIGS. 1 and 2, a supply 36 of ammonia conversion agent supplies the ammonia conversion agent to granulation drum 12 via line 38 and one or more nozzles 40.

Optionally, an air source 42 may be provided for supplying temperature and/or humidity-controlled air at a desired flow rate via an air inlet 44 to selectively modify a rate of air flow through the interior of granulation drum 12. Air is vented from granulation drum 12 via vent 46. Granules are removed from granulation drum 12 via outlet 48 and are conveyed to the interior of drying drum 14. A source of temperature and/or humidity-controlled air 50 may be provided for supplying air via air inlet 52 into dryer drum 14, and the air may be vented from dryer drum 14 via vent 54.

Dried granules exit dryer drum 14 via line 56 and travel to screener 16, which separates material that meets specification and delivers it via an outlet 58 to a finishing system (not illustrated) where any desired final drying, cooling, coating and/or packaging may be accomplished.

In some embodiments, the fertilizer granules recovered from screener 16 may have an average particle diameter (D50) as little as 1 mm, 1.5 mm or 2 mm, or as large as 4 mm, 4.5 mm, or 5 mm, or within any range between and including any two of the foregoing values, such as 1-5 mm, 1.5-4.5 mm, or 2-4 mm, for example. Oversized material is passed to crusher 18 via line 60 and undersized material is passed back into granulation drum 12 via line 22.

As used herein, the phrase "within any range defined between and including any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

The following non-limiting Examples serve to illustrate the disclosure.

EXAMPLE 1

ZnO/AS Granulation

An amount of 24.9 grams of zinc oxide was mixed with 925.1 grams of ground ammonium sulfate, and about half of the resulting solid mixture was added to a laboratory rotating pan granulator as an initial starting material. 180.7 grams of an aqueous binder solution in the form of a sugary, or carbohydrate-based, citrus by-product binder present at 45 wt. % solids was added to a spray bottle for spraying on the solid mixture.

As the rotary pan rotated, the binder solution was sprayed on top of the material, the mixture started to granulate, and ammonia was detected by smell. The other half of the solid mixture was slowly added to the granulation pan as the operator adjusted the wetness/dryness of the mixture for optimum granular growth toward the desired granule size set forth below. After all the solid mixture and binder was consumed, a small dryer was used to dry the granules and finalize the granulation. The granulated product was then dried in an oven overnight at 80° C. for lowering moisture content in the granules. The final dried granules were then screened for size, with a majority of the granules being between 2-4 mm in diameter.

EXAMPLE 2

ZnO/ZnSO$_4$/AS Granulation

An amount of 12.5 grams of zinc oxide and 27.8 grams of ground zinc sulfate monohydrate were blended together, and then mixed with 879.8 grams of ground ammonium sulfate. About half of the solid mixture was added to a laboratory rotating pan granulator as initial starting material. 157.2 grams of sugary blend type aqueous binder solution of Example 1 was added to a spray bottle for spraying on the solid mixture.

As the rotary pan rotated, the binder solution was sprayed on top of the material, the mixture started to granulate, and ammonia was detected by smell. The other half of the solid mixture was slowly added to the granulation pan as the operator adjusted the wetness/dryness of the mixture for optimum granular growth. After all the solid mixture and binder was consumed, a small dryer was used to dry the granules and finalize the granulation. The granulated product was then dried overnight at 80° C. for lowering moisture content in the granules. The final dried granular products were then screened for size, with a majority of the granules being between 2-4 mm in diameter.

EXAMPLE 3

ZnSO$_4$/AS Granulation

An amount of 55.6 grams of ground zinc sulfate monohydrate with a size of about 50 mesh was mixed with 864.4 grams of ground ammonium sulfate, and about half of the solid mixture was added to a laboratory rotating pan granulator as initial starting material. 162 grams of sugary blend type aqueous binder solution of Example 1 was mixed with 162 grams of water before added to a spray bottle to be sprayed on the solid mixture.

As the rotary pan rotated and binder solution was sprayed on top of the material, the mixture started to granulate, though no ammonia was detected by smell during the granulation. The other half of the solid mixture was slowly added to the granulation pan as the operator adjusted the wetness/dryness of the mixture for optimum granular growth. After all the solid mixture and binder was consumed, a small dryer was used to dry the granules and finalize the granulation. The granulated product was then dried in a drying oven overnight at 80° C. for lowering moisture content in the granules. The final dried granular products were then screened for size with majority of the granules being between 2-4 mm in diameter.

EXAMPLE 4

Addition of Concentrated Sulfuric Acid to a ZnO/AS Granulation Run

An amount of 24.9 grams of zinc oxide was mixed with 940.1 grams of ground ammonium sulfate, and about half of the solid mixture was added to a laboratory rotating pan granulator as initial starting material. 31 grams of 98% concentrated sulfuric acid solution was diluted 1:1 by the same amount of water and added to the spray bottle along with 97.2 g binder aqueous solution in the form of corn syrup at 50 wt. % solids.

As the rotary pan rotated and liquid binder with sulfuric acid solution was sprayed on top of the material, the mixture started to granulate, though no ammonia was detected by smell. The other half of the solid mixture was slowly added to the granulation pan as the operator adjusted the wetness/dryness of the mixture for optimum granular growth. After all the solid mixture and liquid binder sulfuric acid solution was consumed, a small dryer was used to dry the granules and finalize the granulation. The granulated product was then dried in an oven overnight at 80° C. for lowering the moisture content in the granules. The final dried granular products were then screened for size with a majority of the granules being between 2-4 mm.

EXAMPLE 5

ZnO/AS Granulation Run with No Binder

An amount of 24.9 grams of zinc oxide was mixed with 975.1 grams of ground ammonium sulfate, and about half of the solid mixture was added to a laboratory rotating pan granulator as initial starting material. 69 grams of water was added to a spray bottle, and no binder was added.

As the rotary pan rotated and water was sprayed on top of the material, the mixture started to granulate, and ammonia was detected by smelled during the granulation process, thereby indicating that the ammonia release was not caused by the binder. The other half of the solid mixture was slowly added to the granulation pan as the operator adjusted the wetness/dryness of the mixture for optimum granular growth. After all the solid mixture and water was consumed, a small dryer was used to dry the granules and finalize the granulation. The granulated product was then dried in an oven overnight at 80° C. for lowering moisture content in the granules. The final dried granular products were then screened for size with a majority of the granules being between 2-4 mm in diameter.

EXAMPLE 6

Ion Chromatography/Water-Soluble Zinc Study

About 200 grams of dried final granular ZnO/AS granules were divided into representative samples of about 25 grams each. An amount of 25.0137 grams of sample was added to a 1000 ml flat bottomed volumetric flask. 984.9 grams of deionized (DI) water was added to the flask with proper shaking to fully dissolve the granules and fill to the maker line of 1000 ml. A magnetic stir bar was added to the solution and the solution was kept stirred. A 5.0343 gram of aliquot was pipetted from the solution to a 100 ml volumetric flask and diluted with 94.629 grams of DI water to the marker line. Based on the first step dissolution and the second step dilution, the total dilution factor was 799.

About 2-3 ml of solution was taken from the final diluted 100 ml flask using a 10 ml syringe, filtered by a syringe filter with 0.45 μm Super® (PES) membrane and injected into a 1.5 ml sample vial with a slit septum. The sample vial was then placed into the autosampler of a Thermo Scientific Dionex ICS-5000+ ion chromatography system and run for soluble zinc content using a developed trace metal method. The final soluble zinc concentration as adjusted by the dilution factor was found to be 11103.7431 mg/L.

EXAMPLE 7

Drum Granulation with Saccharide Binder

Ammonium sulfate is ground to a coarse power to mostly pass through a Tyler 24 screen. Zinc salts powders of zinc oxide (0-3 wt. %) and zinc sulfate (0-5%) are added depending on the zinc content and ratio of soluble to non-soluble zinc desired. The powders are mixed and then a liquid saccharide binder is added at a rate of 1-2 wt. % along with additional water to allow the binder to spread and coat the powder as necessary.

Undersized recycle is added to the mixture along with ground oversize typical for granulation operations. The mixture is rolled in the granulation drum to allow the binder to granulate the powder to a size useful for fertilizer products (typically a mean size of 2.5 mm). The granulated mixture is discharged from the drum to a heated dryer to reduce the water content sufficient to allow for screening and storage of the product. The dried product is passed through a screener to remove the size range useful for the product. The undersized material is recycled back to the granulation operation along with over-sized granules that have been sized-reduced (typically with a chain mill or other suitable device).

EXAMPLE 8

Mixer Mill Granulation

Ammonium sulfate is ground to a coarse power to mostly pass through a Tyler 24 screen. An equal-molar mixture of zinc oxide and zinc sulfate powder is added to 4-4.5 wt. %. Gypsum powder in the range of 4-8 wt. % is also added and the powders mixed to uniformly distribute the zinc and gypsum with the ammonium sulfate.

33-35% undersize recycle is added to the powder and mixed. A lignin sulfate binder is added to 2.5-4.5 wt. % (dry weight basis) along with 8-12 wt. % water. The material is then mixed a sufficient time (depending on the machine and the speed/power of the mixing device) to bring the mixture together into a crumbly mass but avoiding over-mixing to a smooth, uniform mud-like material.

The mixed material is discharged and feed at a steady rate to a drum drying device where the wet mass can finish rolling-out into granules as the heat removed the excess moisture. The dried granules are discharged to a screening device to recover the product-size particles. Undersize material is retained for recycle and over-sized material is size-reduced and added to the recycle.

EXAMPLE 9

CuO/AS Granulation

An amount of copper (II) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$CuO+(NH_4)_2SO_4 \rightarrow CuSO_4+H_2O+2NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 10

FeO/AS Granulation

An amount of iron (II) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$FeO+(NH_4)_2SO_4 \rightarrow FeSO_4+H_2O+2NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 11

Fe$_2$O$_3$/AS Granulation

An amount of iron (III) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$Fe_2O_3 + 3(NH_4)_2SO_4 \rightarrow Fe_2(SO_4)_3 + 3H_2O + 6NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 12

MnO/AS Granulation

An amount of manganese (II) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$MnO + (NH_4)_2SO_4 \rightarrow MnSO_4 + H_2O + 2NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 13

MoO$_3$/AS Granulation

An amount of molybdenum (VI) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$MoO_3 + 3(NH_4)_2SO_4 \rightarrow Mo(SO_4)_3 + 3H_2O + 6NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 14

CoO/AS Granulation

An amount of cobalt (II) oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$CoO + (NH_4)_2SO_4 \rightarrow Co(SO_4) + H_2O + 2NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 15

MgO/AS Granulation

An amount of magnesium oxide is mixed with an amount of ground ammonium sulfate to form a solid mixture, and the solid mixture is added to a granulator as an initial starting material. An aqueous solution of a binder at 45 wt. % solids is sprayed on the solid mixture.

As the granulator rotates, additional binder solution is sprayed on top of the material, the mixture starts to granulate, and ammonia is detected by smell upon generation of ammonia according to the equation below:

$$MgO + (NH_4)_2SO_4 \rightarrow Mg(SO_4) + H_2O + 2NH_3$$

Further amounts of the solid mixture are slowly added to the granulator as the operator adjusts the wetness/dryness of the mixture for optimum granular growth toward a desired granule size. After all the solid mixture and binder is consumed, a dryer is used to dry the granules and finalize the granulation. The granulated product is then dried further in an oven for lowering moisture content in the granules as desired. The final dried granules are then screened for size.

EXAMPLE 16

Conversion of Metal Oxides to Metal Sulfates

Various metal oxides are combined with ammonium sulfate to test their solubility in the formulation. A sample of the metal oxide (MO) is mixed with standard ammonium sulfate (AS) in deionized water (100 mL). The composition of tested samples is shown below in Table 1.

TABLE 1

| MO | Cup mass (g) | MO mass (g) | AS mass (g) | Total solids (g) (MO + AS) | Total mass (g) |
|---|---|---|---|---|---|
| ZnO | 10.1583 | 0.3165 | 4.8518 | 5.1683 | 114.13 |
| CuO | 10.099 | 0.3599 | 4.6957 | 5.0556 | 114.0431 |
| MnO | 10.3752 | 0.3327 | 4.6867 | 5.0194 | 114.1964 |

TABLE 1-continued

| MO | Cup mass (g) | MO mass (g) | AS mass (g) | Total solids (g) (MO + AS) | Total mass (g) |
|---|---|---|---|---|---|
| MgO | 10.3824 | 0.4797 | 4.6697 | 5.1494 | 114.3064 |
| FeO | 10.0507 | 0.3223 | 4.6802 | 5.0025 | 114.8131 |
| $Fe_2O_3$ | 10.3767 | 0.3592 | 4.647 | 5.0062 | 114.0819 |

Next, theoretical percentage of the metal in the metal oxide is determined, as is the calculated percentage of the metal in the mixture of metal oxide and ammonium sulfate. Finally, metal content in the soluble fractions is determined by inductively coupled plasma (ICP) analysis using a Waypoint ICP.

The percentage of the metal converted to a soluble form is then determined. The results from these analyses are shown below in Table 2. The detection limit for iron is 50 ppm for this analysis; therefore, the data for iron (II) oxide and iron (III) oxide is reported as below 50 ppm rather than a specific number.

TABLE 2

| MO | Theoretical M % in MO | Calculated M % in AS/ MO mixture | Measured metal content (ppm) | % Conversion to soluble metal |
|---|---|---|---|---|
| ZnO | 80 | 4.9 | 541 | 1.09 |
| CuO | 80 | 5.7 | 25.5 | 0.05 |
| MnO | 77 | 5.1 | 858 | 1.77 |
| MgO | 60 | 5.6 | 2460 | 4.96 |
| FeO | 78 | 5.0 | <50 (measurement limit) | 0.10 |
| $Fe_2O_3$ | 70 | 5.0 | <50 (measurement limit) | 0.10 |

Thus, the data demonstrate that over one percent of zinc oxide is successfully converted to a soluble form, while 1.77 percent of manganese oxide is converted, and nearly 5 percent of magnesium oxide is converted.

Aspects

Aspect 1 is a fertilizer composition, comprising solid granules each including a homogeneous blend of ammonium sulfate, a water insoluble oxide of a micronutrient metal, and a water-soluble sulfate of the micronutrient metal.

Aspect 2 is the fertilizer composition of Aspect 1, wherein the solid granules each comprise at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition.

Aspect 3 is the fertilizer composition of Aspects 1 or 2, wherein the solid granules each comprise ammonium sulfate in an amount of 80 wt. % to 98 wt. %, based on a total weight of the fertilizer composition.

Aspect 4 is the fertilizer composition of any of Aspects 1-3, wherein the solid granules each comprise the water insoluble oxide of the micronutrient metal in an amount of 0.1 wt. % to 3 wt. %, based on a total weight of the fertilizer composition.

Aspect 5 is the fertilizer composition of any of Aspects 1-4, wherein the solid granules each comprise the water-soluble sulfate of the micronutrient metal in an amount of 0.1 wt. % to 5 wt. %, based on a total weight of the fertilizer composition.

Aspect 6 is the fertilizer composition of any of Aspects 1-5, wherein the micronutrient metal includes at least one metal selected from the group consisting of zinc, copper, iron, magnesium, manganese, molybdenum, and cobalt.

Aspect 7 is the fertilizer composition of any of Aspects 1-6, wherein the micronutrient metal is zinc, the water insoluble oxide of a micronutrient metal is zinc oxide, and the water-soluble sulfate of the micronutrient metal is zinc sulfate.

Aspect 8 is the fertilizer composition of any of Aspects 1-6, wherein the micronutrient metal is copper, the water insoluble oxide of a micronutrient metal is copper oxide, and the water-soluble sulfate of the micronutrient metal is copper sulfate.

Aspect 9 is the fertilizer composition of any of Aspects 1-6, wherein the micronutrient metal is iron, the water insoluble oxide of a micronutrient metal is iron oxide, and the water-soluble sulfate of the micronutrient metal is iron sulfate.

Aspect 10 is the fertilizer composition of any of Aspects 1-6, wherein the micronutrient metal is manganese, the water insoluble oxide of a micronutrient metal is manganese oxide, and the water-soluble sulfate of the micronutrient metal is manganese sulfate.

Aspect 11 is the fertilizer composition of any of Aspects 1-6, wherein the micronutrient metal is molybdenum, the water insoluble oxide of a micronutrient metal is molybdenum oxide, and the water-soluble sulfate of the micronutrient metal is molybdenum sulfate.

Aspect 12 is the fertilizer composition of any of Aspects 1-6, wherein the micronutrient metal is cobalt, the water insoluble oxide of a micronutrient metal is cobalt oxide, and the water-soluble sulfate of the micronutrient metal is cobalt sulfate.

Aspect 13 is the fertilizer composition of any of Aspects 1-6, wherein the micronutrient metal is magnesium, the water insoluble oxide of a micronutrient metal is magnesium oxide, and the water-soluble sulfate of the micronutrient metal is magnesium sulfate.

Aspect 14 is the fertilizer composition of any of Aspects 1-13, wherein the solid granules of the fertilizer composition further comprise at least one binder present in an amount of 1.0 wt. % to 10.0 wt. %, based on a total weight of the fertilizer composition.

Aspect 15 is the fertilizer composition of any of Aspects 1-14, wherein all chemical components other than ammonium sulfate, the water insoluble oxide of the micronutrient metal, the water-soluble sulfate of the micronutrient metal, and the binder are present in a total amount of less than 1.0 wt. %.

Aspect 16 is a method of forming a fertilizer composition, comprising the steps of: combining ammonium sulfate and a water insoluble oxide of a micronutrient metal; granulating the ammonium sulfate and water insoluble oxide of the micronutrient metal in the presence of a liquid to initiate reaction of a portion of the ammonium sulfate with a portion of the water insoluble oxide of the micronutrient metal to form ammonia and a water-soluble sulfate of the micronutrient metal; and producing a fertilizer composition in the form of solid fertilizer granules each comprising a homogeneous blend of ammonium sulfate, the water insoluble oxide of the micronutrient metal, and the water-soluble sulfate of the micronutrient metal.

Aspect 17 is the method of Aspect 16, wherein the liquid is an aqueous solution of a binder.

Aspect 18 is the method of Aspects 16 or 17, further comprising the additional steps of: adding an ammonia conversion agent to the mixture; and reacting the ammonia conversion agent with the ammonia to form ammonium sulfate.

Aspect 19 is the method of any of Aspects 16-18, wherein the solid fertilizer granules each comprise at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition.

Aspect 20 is the method of any of Aspects 16-19, wherein the solid fertilizer granules each comprise ammonium sulfate in an amount of 80 wt. % to 98 wt. %, based on a total weight of the fertilizer composition.

Aspect 21 is the method of any of Aspects 16-20, wherein the solid fertilizer granules each comprise the water insoluble oxide of the micronutrient metal in an amount of 0.1 wt. % to 3 wt. %, based on a total weight of the fertilizer composition.

Aspect 22 is the method of any of Aspects 16-21, wherein the solid fertilizer granules each comprise the water-soluble sulfate of the micronutrient metal in an amount of 0.1 wt. % to 5 wt. %, based on a total weight of the fertilizer composition.

Aspect 23 is the method of any of Aspects 16-21, wherein the micronutrient metal includes at least one metal selected from the group consisting of zinc, copper, iron, magnesium, manganese, molybdenum, and cobalt.

Aspect 24 is the method of any of Aspects 16-22, wherein the micronutrient metal is zinc, the water insoluble oxide of a micronutrient metal is zinc oxide, and water-soluble sulfate of the micronutrient metal is zinc sulfate.

Aspect 25 is the method of any of Aspects 16-22, wherein the micronutrient metal is copper, the water insoluble oxide of a micronutrient metal is copper oxide, and the water-soluble sulfate of the micronutrient metal is copper sulfate.

Aspect 26 is the method of any of Aspects 16-22, wherein the micronutrient metal is iron, the water insoluble oxide of a micronutrient metal is iron oxide, and the water-soluble sulfate of the micronutrient metal is iron sulfate.

Aspect 27 is the method of any of Aspects 16-22, wherein the micronutrient metal is manganese, the water insoluble oxide of a micronutrient metal is manganese oxide, and the water-soluble sulfate of the micronutrient metal is manganese sulfate.

Aspect 28 is the method of any of Aspects 16-22, wherein the micronutrient metal is molybdenum, the water insoluble oxide of a micronutrient metal is molybdenum oxide, and the water-soluble sulfate of the micronutrient metal is molybdenum sulfate.

Aspect 29 is the method of any of Aspects 16-22, wherein the micronutrient metal is cobalt, the water insoluble oxide of a micronutrient metal is cobalt oxide, and the water-soluble sulfate of the micronutrient metal is cobalt sulfate.

Aspect 30 is the method of any of Aspects 16-22, wherein the micronutrient metal is magnesium, the water insoluble oxide of a micronutrient metal is magnesium oxide, and the water-soluble sulfate of the micronutrient metal is magnesium sulfate.

Aspect 31 is the method of any of Aspects 16-29, wherein the solid fertilizer granules further comprise at least one binder present in an amount of 1.0 wt. % to 10.0 wt. %, based on a total weight of the fertilizer composition.

Aspect 32 is the method of any of Aspects 16-30, wherein all chemical components the solid fertilizer granules other than ammonium sulfate, the water insoluble oxide of the micronutrient metal, the water-soluble sulfate of the micronutrient metal, and the binder are present in a total amount less of than 1.0 wt. %.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A fertilizer composition, comprising solid granules each including a homogeneous blend of ammonium sulfate, a water insoluble oxide of a micronutrient metal, and a water-soluble sulfate of the micronutrient metal, wherein the solid granules each comprise at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition.

2. The fertilizer composition of claim 1, wherein the micronutrient metal includes at least one metal selected from the group consisting of zinc, copper, iron, magnesium manganese, molybdenum, and cobalt.

3. The fertilizer composition of claim 2, wherein the micronutrient metal is zinc, the water insoluble oxide of a micronutrient metal is zinc oxide, and the water-soluble sulfate of the micronutrient metal is zinc sulfate.

4. The fertilizer composition of claim 1, wherein the solid granules of the fertilizer composition further comprise at least one binder present in an amount of 1.0 wt. % to 10.0 wt. %, based on a total weight of the fertilizer composition.

5. The fertilizer composition of claim 4, wherein all chemical components other than ammonium sulfate, the water insoluble oxide of the micronutrient metal, the water-soluble sulfate of the micronutrient metal, and the binder are present in a total amount of less than 1.0 wt. %.

6. The fertilizer composition of claim 1, wherein the solid granules each comprise ammonium sulfate in an amount of 80 wt. % to 98 wt. %, based on a total weight of the fertilizer composition.

7. The fertilizer composition of claim 1, wherein the solid granules each comprise the water insoluble oxide of the micronutrient metal in an amount of 0.1 wt. % to 3 wt. %, based on a total weight of the fertilizer composition.

8. The fertilizer composition of claim 1, wherein the solid granules each comprise the water-soluble sulfate of the micronutrient metal in an amount of 0.5 wt. % to 5 wt. %, based on a total weight of the fertilizer composition.

9. A method of forming a fertilizer composition, comprising the steps of:
   combining ammonium sulfate and a water insoluble oxide of a micronutrient metal;
   granulating the ammonium sulfate and water insoluble oxide of the micronutrient metal in the presence of a liquid to initiate reaction of a portion of the ammonium sulfate with a portion of the water insoluble oxide of the micronutrient metal to form ammonia and a water-soluble sulfate of the micronutrient metal, wherein the solid fertilizer granules each comprise at least 80 wt. % ammonium sulfate, at least 1.0 wt. % of the water insoluble oxide of the micronutrient metal, and at least 0.5 wt. % of the water-soluble sulfate of the micronutrient metal, based on a total weight of the fertilizer composition; and
   producing a fertilizer composition in the form of solid fertilizer granules each comprising a homogeneous blend of ammonium sulfate, the water insoluble oxide of the micronutrient metal, and the water-soluble sulfate of the micronutrient metal.

10. The method of claim 9, wherein the micronutrient metal includes at least one metal selected from the group consisting of zinc, copper, iron, magnesium, manganese, molybdenum, and cobalt.

11. The method of claim 10, wherein the micronutrient metal is zinc, the water insoluble oxide of a micronutrient metal is zinc oxide, and water-soluble sulfate of the micronutrient metal is zinc sulfate.

12. The method of claim 9, wherein the solid fertilizer granules further comprise at least one binder present in an amount of 1.0 wt. % to 10.0 wt. %, based on a total weight of the fertilizer composition.

13. The method of claim 12, wherein all chemical components the solid fertilizer granules other than ammonium sulfate, the water insoluble oxide of the micronutrient metal, the water-soluble sulfate of the micronutrient metal, and the binder are present in a total amount less of than 1.0 wt. %.

14. The method of claim 9, wherein the liquid is an aqueous solution of a binder.

15. The method of claim 9, further comprising the additional steps of:
adding an ammonia conversion agent to the mixture; and
reacting the ammonia conversion agent with the ammonia to form ammonium sulfate.

16. The method of claim 9, wherein the solid fertilizer granules each comprise ammonium sulfate in an amount of 80 wt. % to 98 wt. %, based on a total weight of the fertilizer composition.

17. The method of claim 9, wherein the solid fertilizer granules each comprise the water insoluble oxide of the micronutrient metal in an amount of 0.5 wt. % to 3 wt. %, based on a total weight of the fertilizer composition.

18. The method of claim 9, wherein the solid fertilizer granules each comprise the water-soluble sulfate of the micronutrient metal in an amount of 0.1 wt. % to 5 wt. %, based on a total weight of the fertilizer composition.

* * * * *